United States Patent
Khatana et al.

(10) Patent No.: US 8,428,183 B2
(45) Date of Patent: *Apr. 23, 2013

(54) IN-PHASE AND QUADRATURE PATTERN ALIGNMENT FOR QUADRATURE PHASE SHIFT KEYING OPTICAL TRANSMITTERS

(75) Inventors: Sunil Kumar Singh Khatana, Sunnyvale, CA (US); Edem Ibragimov, Santa Clara, CA (US)

(73) Assignee: Opnext Subsystems, Inc., San Jose, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 13/078,816

(22) Filed: Apr. 1, 2011

(65) Prior Publication Data

US 2012/0250793 A1    Oct. 4, 2012

(51) Int. Cl.
*H04L 27/20*    (2006.01)

(52) U.S. Cl.
USPC ........... 375/308; 375/329; 375/279; 398/154; 398/155; 398/156; 398/65; 398/152; 398/184; 332/102

(58) Field of Classification Search ............ 398/154, 398/155, 156, 65, 152, 184; 375/308, 329, 375/279; 332/103
See application file for complete search history.

(56) References Cited

U.S. PATENT DOCUMENTS

| | | |
|---|---|---|
| 2006/0280264 A1 | 12/2006 | Isaac et al. |
| 2008/0187073 A1* | 8/2008 | Lampe et al. ............ 375/298 |
| 2009/0036079 A1* | 2/2009 | Lindoff et al. ........... 455/246.1 |
| 2011/0116558 A1 | 5/2011 | Otaka et al. |

FOREIGN PATENT DOCUMENTS

WO    WO2009147891    12/2009

OTHER PUBLICATIONS

Authorized Officer H. Filip. International Search Report and Written Opinion in International Application PCT/US2012/031143, dated Apr. 6, 2012, 81 pages.

* cited by examiner

*Primary Examiner* — Daniel Washburn
*Assistant Examiner* — Rahel Guarino
(74) *Attorney, Agent, or Firm* — Fenwick & West LLP

(57) ABSTRACT

I/Q data skew in a QPSK modulator may be detected by sending identical or complementary data streams to I and Q channel PSK modulators, setting the relative carrier phase between I and Q to zero or π, and monitoring the average QPSK output power, where the data streams sent to the I and Q channels include pseudorandom streams of ones and zeroes.

19 Claims, 10 Drawing Sheets

IN-PHASE AND QUADRATURE PATTERN ALIGNMENT FOR QUADRATURE PHASE SHIFT KEYING OPTICAL TRANSMITTERS

TECHNICAL FIELD

The disclosure is generally related to optical communications systems and in particular to alignment of in-phase (I) and quadrature (Q) data in a quadrature phase shift keying (QPSK) optical transmitter.

BACKGROUND

Next-generation long-haul, fiber-optic communications systems are being designed to operate at 100 gigabits per second over distances of 1,000 kilometers or more. Data are encoded on an optical carrier signal using a quadrature phase shift keying (QPSK) modulator. In QPSK, symbols are represented by one of four points in the I-Q plane. Thus each symbol represents two bits.

For proper operation, data in I and Q channels of a QPSK system are pattern-aligned; i.e. multi-unit-interval skew between I and Q data is reduced or eliminated. In a laboratory setting, deskewing may be performed manually by using external test instrumentation and observing eye diagrams. Skew can vary across power cycles or clock resets, however. It would be convenient if I/Q alignment could be made part of an automatic, self-calibration procedure that could be done at power-up, after clock resets, or whenever desired in the field.

Thus what are needed are methods for automatic I/Q alignment in QPSK systems. The methods should not depend on advanced features of a MUX. Furthermore the methods should be able to correct skew offsets that are greater than one unit interval of the I or Q data streams.

DETAILED DESCRIPTION

Methods for minimizing I/Q data skew in a QPSK transmitter are now described. In the optical domain, the methods may be applied to each polarization of a dual-polarization QPSK transmitter (DP-QPSK) independently.

In QPSK operation, I and Q carrier signals have a relative phase shift $\Phi$ of $\pi/2$. The methods described here involve operating an I/Q phase control loop to temporarily maintain a zero or $\pi$ phase shift between I and Q carriers. When $\Phi$ is zero or $\pi$, and identical data streams are introduced to the I and Q channels, the average output power observed at the output of a QPSK modulator is indicative of the alignment between I and Q data. Here "average" means average over times much longer (10× or more) than one unit interval of data, or, equivalently, much longer than the reciprocal of the data rate.

When $\Phi=\pi$, for example, minimum data skew corresponds to minimum average output power; when $\Phi=0$, the opposite is true—minimum skew corresponds to maximum average output power. Principles leading to these effects and methods for taking advantage of them to remove skew of more than one unit interval are now described in more detail.

Figure 1A:
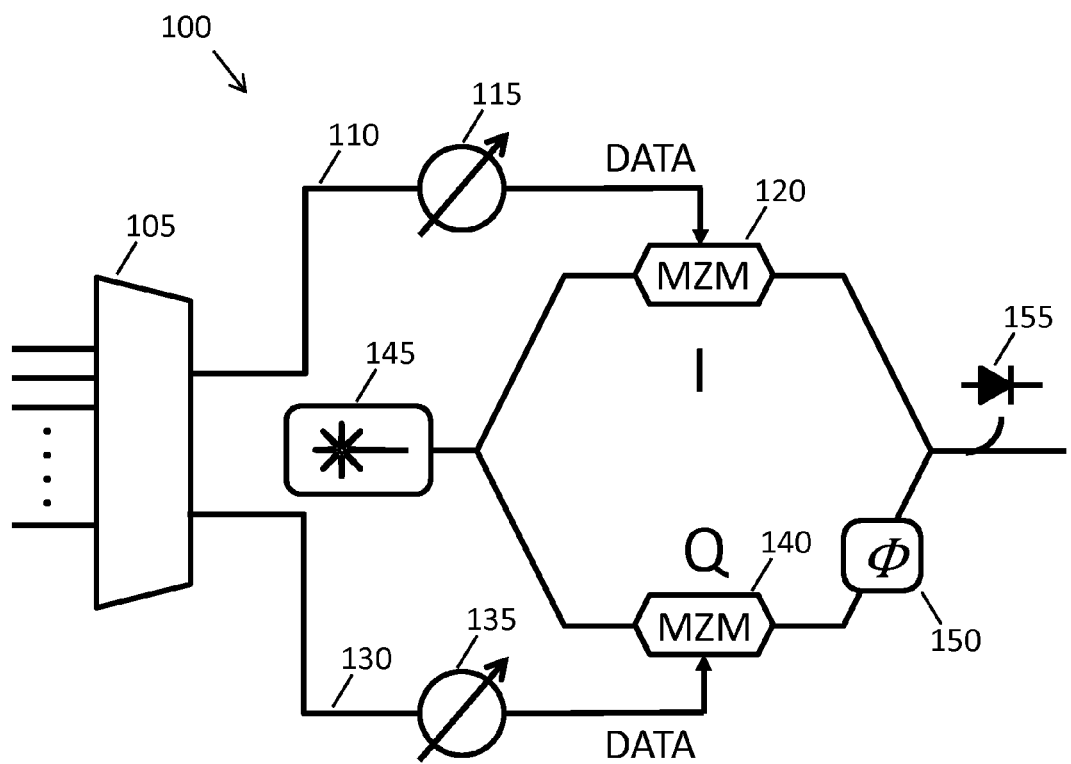
FIG. 1A shows an integrated circuit feeding data to I and Q channels of an optical QPSK modulator.

FIG. 1A shows an example of a transmitter system 100 including an integrated circuit 105 feeding data to I and Q channels of an optical QPSK modulator. The integrated circuit 105 combines several incoming data lanes into two output data streams 110 and 130. Data stream 110 passes through optional adjustable delay 115 before being input to phase-shift keying (PSK) modulator 120. Similarly, data stream 130 passes through optional adjustable delay 135 before being input to phase-shift keying (PSK) modulator 140. Either adjustable delay 115 or adjustable delay 135 is optional; at least one of them is required so that the relative delay, or skew, between data streams 110 and 130 may be adjusted. PSK modulators 120 and 140 may be realized as Mach-Zehnder modulators. Laser 145 is a light source for the system. Phase controller 150 adjusts the carrier phase $\Phi$ between the outputs of the in-phase 120 and quadrature 140 PSK modulators. Detector 155 measures the average power at the output of the QPSK modulator. Although omitted from the figure for clarity, a return-to-zero (RZ) carver may be placed at the output of laser 145 and optional amplifiers may be inserted between adjustable delay 115 and Mach-Zehnder modulator 120 or between adjustable delay 135 and Mach-Zehnder modulator 140.

Although the methods described herein are done so primarily with reference to optical QPSK systems (e.g., the transmitter system 100), they are also applicable to QPSK systems operating at lower frequencies, e.g. terahertz, microwave, UHF, etc. Component implementations are different at lower frequencies—RF sources instead of lasers, transmission lines instead of optical fibers—but the principles of operation are the same.

Figure 1B:
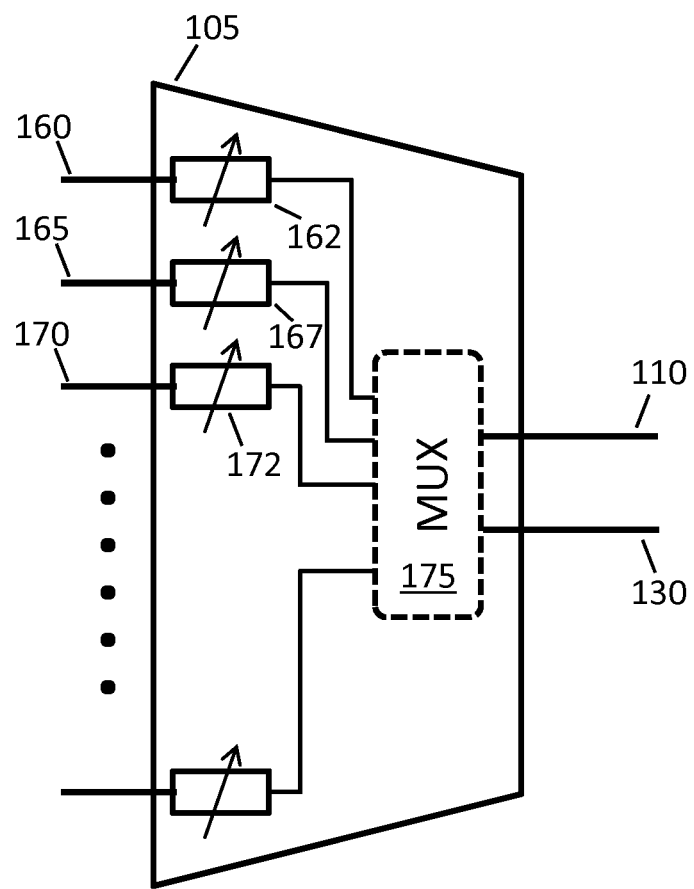
FIG. 1B provides an expanded view of the circuit of FIG. 1 including unit-interval adjustable delays preceding a multiplexer.

FIG. 1B shows an expanded view of the integrated circuit 105 including unit-interval adjustable delays preceding a multiplexer. The integrated circuit 105 includes unit-interval (UI) adjustable delays such as 162, 167 and 172 that impart delays on input lanes 160, 165 and 170, respectively. Adjustable delays 162, 167 and 172 are adjustable in one-UI increments and they may impart delays of any integer number of unit intervals. The outputs of the delays are sent to multiplexer 175; the multiplexer's outputs 110 and 130 then feed the I and Q optical modulators as shown in FIG. 1A. The myriad other components of circuit 105 are not shown.

Each output lane of multiplexer 175 carries data originating from a specific group of input lanes. For example, suppose the multiplexer has eight input lanes. The first four lanes are multiplexed to provide data on output 110 which is connected to the in-phase (I) optical modulator, while the second four lanes are multiplexed to provide data on output 130 which is connected to the quadrature (Q) optical modulator. Skew between I and Q data streams may then be adjusted by operating adjustable data delays (e.g. 162, 167, 172, etc.) for all lanes in a group together. If the I data stream is one UI ahead of the Q data stream for example, then all of the input lanes that are multiplexed to form the I data stream may be delayed by one UI using their individual data delays to remove the I/Q skew.

Integer UI data delays (e.g. 162, 167, 172, etc.) are provided upstream from each multiplexer input data stream rather than downstream from the multiplexer outputs for at least two reasons. First, input lanes may need to be aligned relative to each other before multiplexing. Second, data delays are simpler and less expensive to implement at the relatively low multiplexer input data rate compared to the fast multiplexer output data rate.

Figure 2:
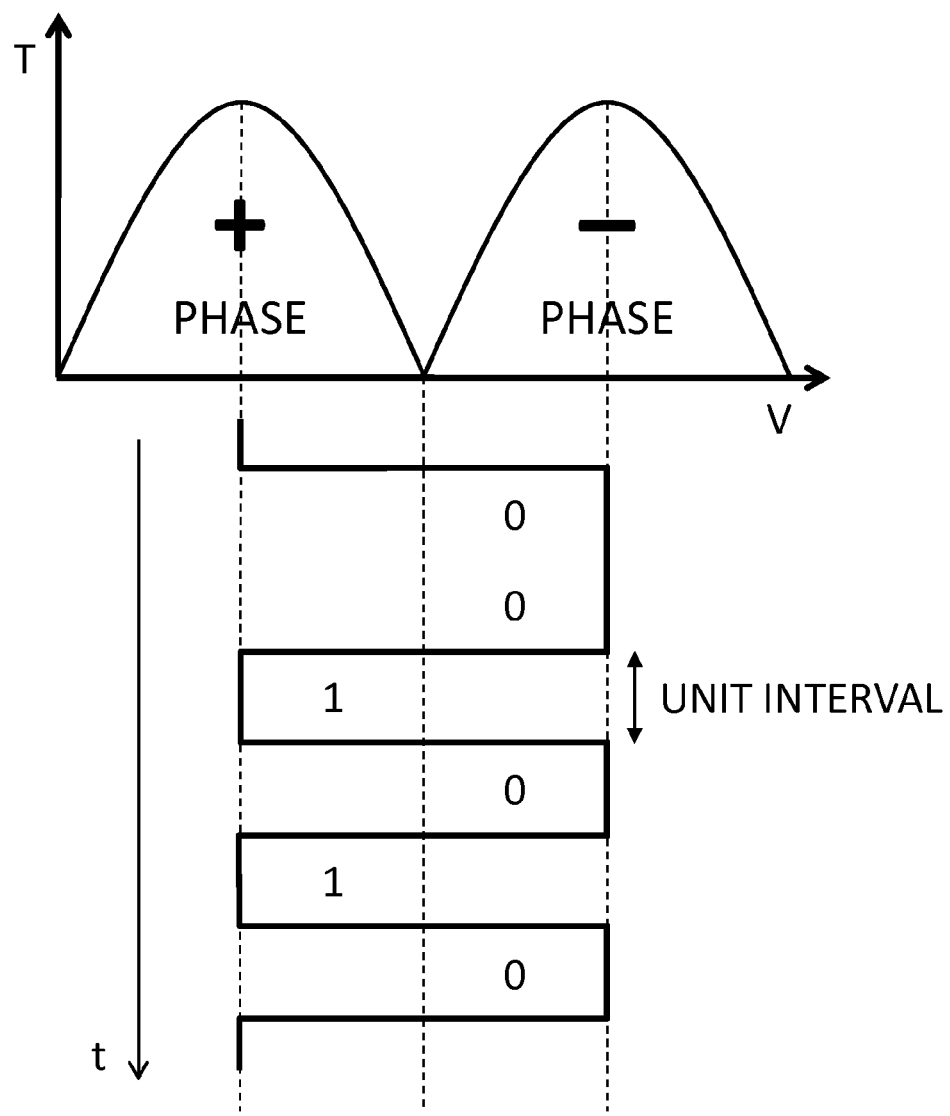
FIG. 2 shows a transfer function for a Mach-Zehnder optical modulator.

FIG. 2 shows a transfer function for a Mach-Zehnder optical modulator. In FIG. 2, transmission of a Mach-Zehnder modulator, T, is graphed along a horizontal direction as a function of applied voltage, V. Data, in the form of voltage levels, V, plotted in a vertical direction versus time, t, is also shown. A Mach-Zehnder modulator may be biased such that a voltage level representing logical zero generates maximum transmission with a certain carrier phase, denoted by "+" in the figure. Voltage representing logical one also generates maximum transmission, but with a π phase shift, denoted by "−" in the figure.

Figure 3:
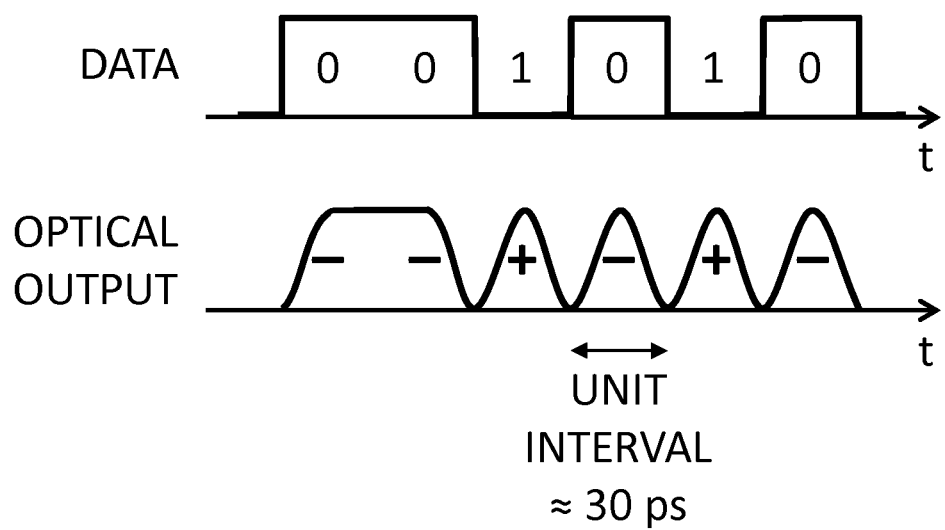
FIG. 3 shows the relationship between input data and output optical signals in a Mach-Zehnder optical modulator.

FIG. 3 shows the relationship between input data and output optical signals in a Mach-Zehnder optical modulator. An incoming data stream of logical ones and zeroes encoded as voltages is converted into equal amplitude light pulses with ones and zeroes represented by 0 or π phase shift. Light output is minimized at transitions from zero to one or one to zero. In a 32 Gb/s modulator, as an example, the unit interval or time allotted to one "1" or "0" is approximately 33 ps.

Figure 4:
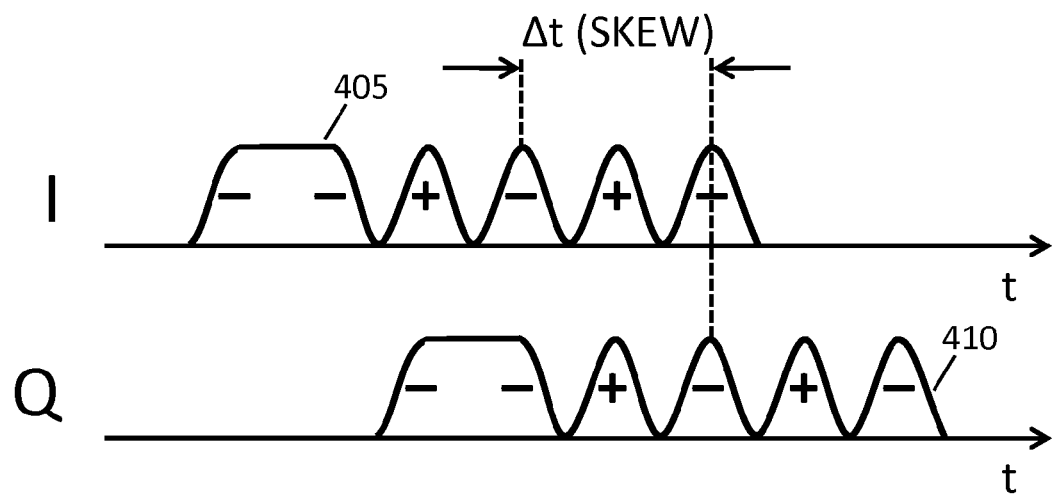
FIG. 4 illustrates skew between I and Q optical signals.

FIG. 4 illustrates skew between I and Q optical signals. In FIG. 4, graphs 405 and 410 depict optical output from Mach-Zehnder modulators in the I and Q branches, respectively, of a system such as that shown in FIG. 1A. "+" and "−" indicate the phase of the optical carrier. In FIG. 4, the data in the I and Q channels is the same, but there is a time delay or skew of two unit intervals between them indicated by "Δt". A goal of I/Q alignment methods described in this specification is to minimize Δt by adjusting the skew between the I and Q channels in integer-UI increments.

Figure 5A:
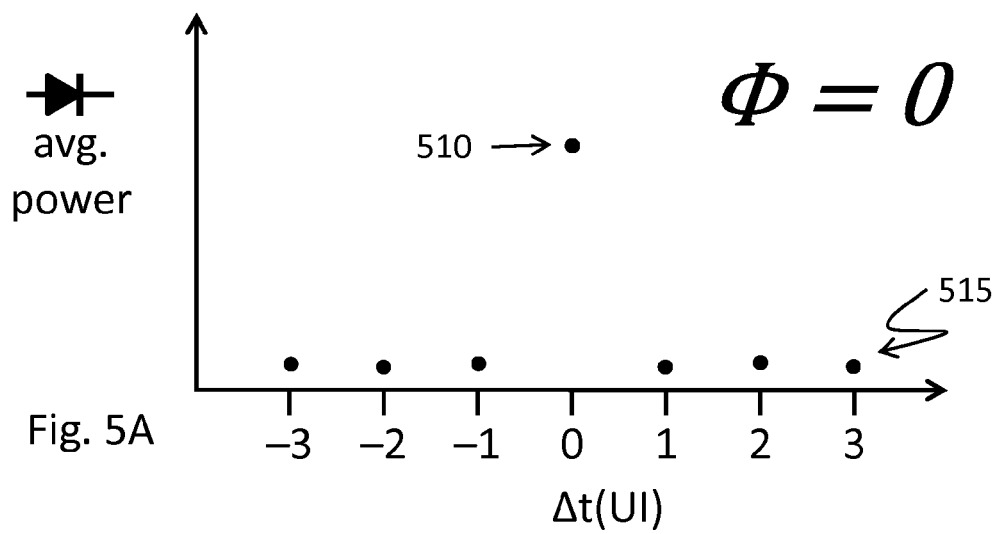
FIGS. 5A and 5B show graphs of average power detected versus skew.

In operation, the carrier phase Φ difference between the I and Q data channels is π/2. On one hand, if the carrier phase Φ difference between the I and Q data channels is set to zero, then when the data in two channels is the same, minimum skew corresponds to maximum average power in the combined output of the QPSK modulator due to constructive interference. The relation between skew and average power for this case is shown in FIG. 5A. On the other hand, if the carrier phase Φ difference between the I and Q data channels is set to π, then when the data in two channels is the same, minimum skew corresponds to minimum average power in the combined output of the QPSK modulator due to destructive interference. The relation between skew and average power for this case is shown in FIG. 5B.

Figure 5B:
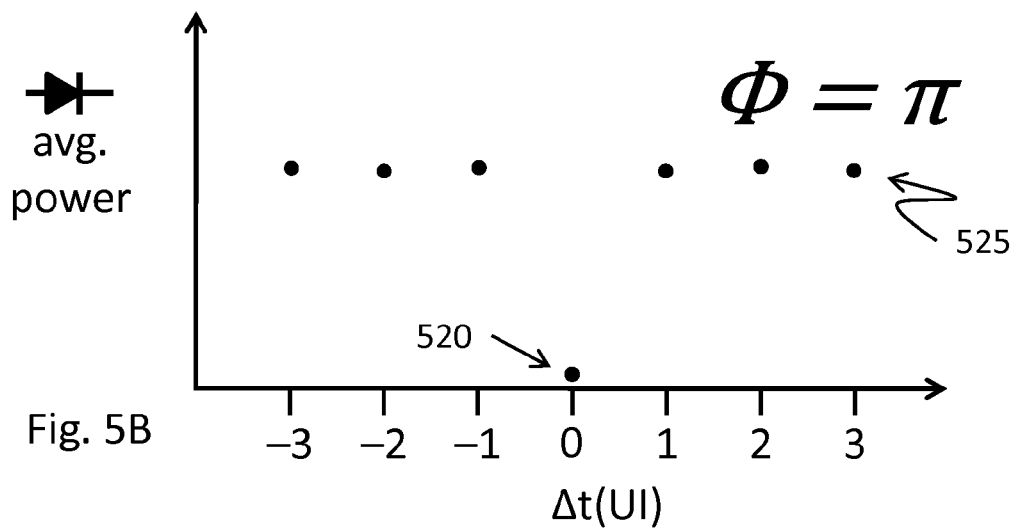

In addition, FIGS. 5A and 5B show how measuring average modulator output power as a function of skew and carrier phase permits monitoring and control of skew between I and Q data.

If the input data (identical copies to I and Q) is a pseudorandom bit stream, then a maximum 510 (Φ=0) or minimum 520 (Φ=π) in average output power can be observed at zero skew, but the average power can be approximately flat 515, 525 more than one unit interval away from zero skew. A sudden change 510, 520 of average output power can be observed at zero skew. In FIG. 5 the skew is adjusted in discrete, one-UI steps. This may be accomplished in the system of FIGS. 1A and 1B through the use of unit-interval (UI) adjustable delays such as 162, 167 and 172 that impart delays on input lanes 162, 165 and 170, respectively.

Thus, a pseudorandom bit stream provides a way to eliminate multi-UI skew. (Methods for removing sub-UI skew are described in co-pending application Ser. No. 13/078,733 filed on Apr. 1, 2011 and incorporated herein by reference.) Skews less than half the length of the pseudorandom pattern can be reliably detected. Thus correction of larger skews requires longer pseudorandom patterns.

In practice it may be easier to precisely identify a minimum, rather than a maximum average power at the QPSK output. If it is more convenient, or perhaps only possible, to set φ=0 rather than φ=π, then complementary, rather than identical, data streams may be sent to the I and Q data inputs. (Here the complement to a series of bits is the same series except "0" is replaced by "1" and vice versa.) For example if "1011011000111" is sent to I and its complement "0100100111000" is sent to Q, then minimum skew with Φ=0 will coincide with minimum QPSK average output power. It is of course possible to devise other schemes involving carrier phase Φ and data polarity to identify skew.

Figure 6A:
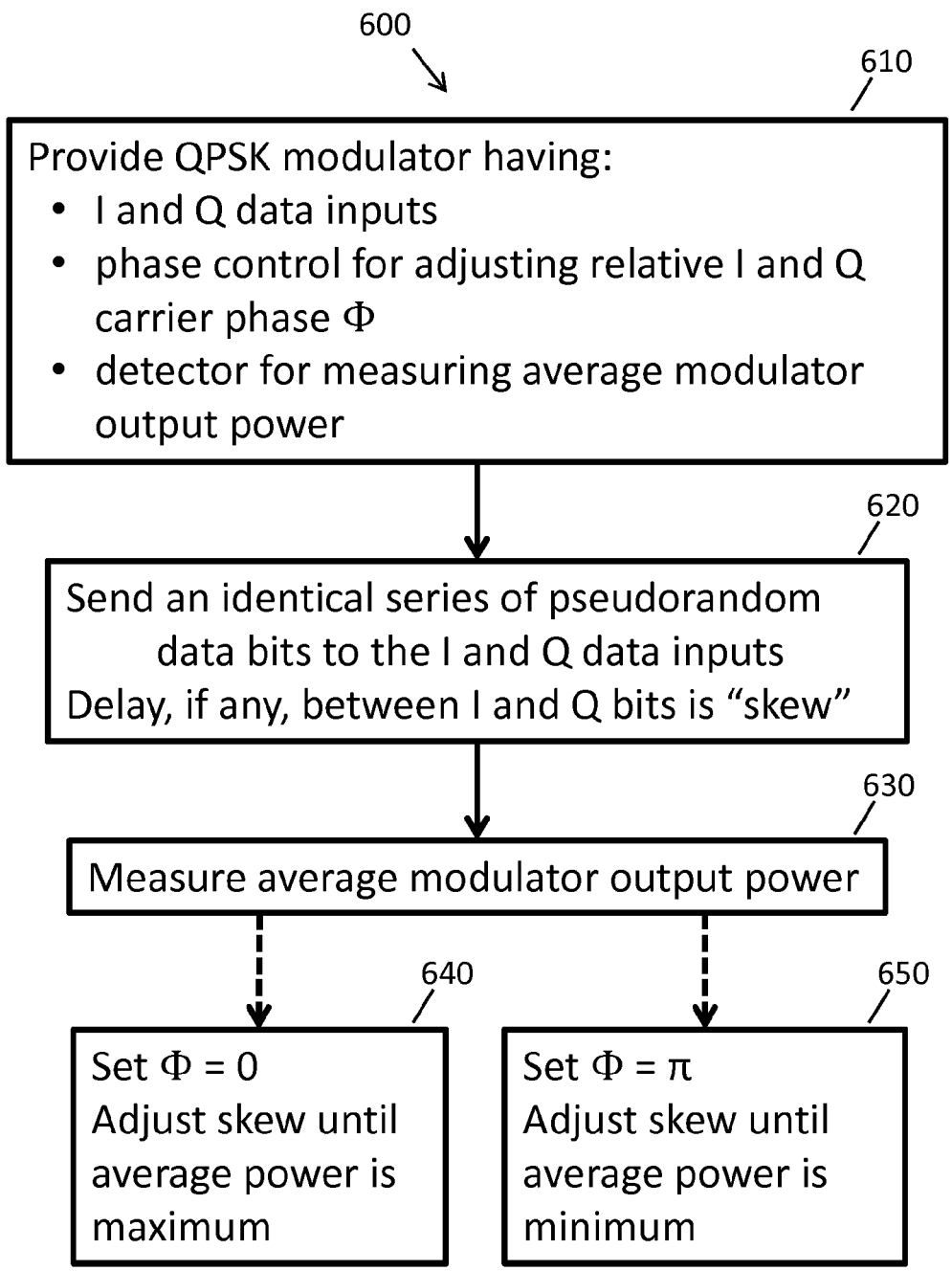
FIGS. 6A and 6B are a flow chart for an I/Q data alignment method using identical data streams.
Figure 6B:
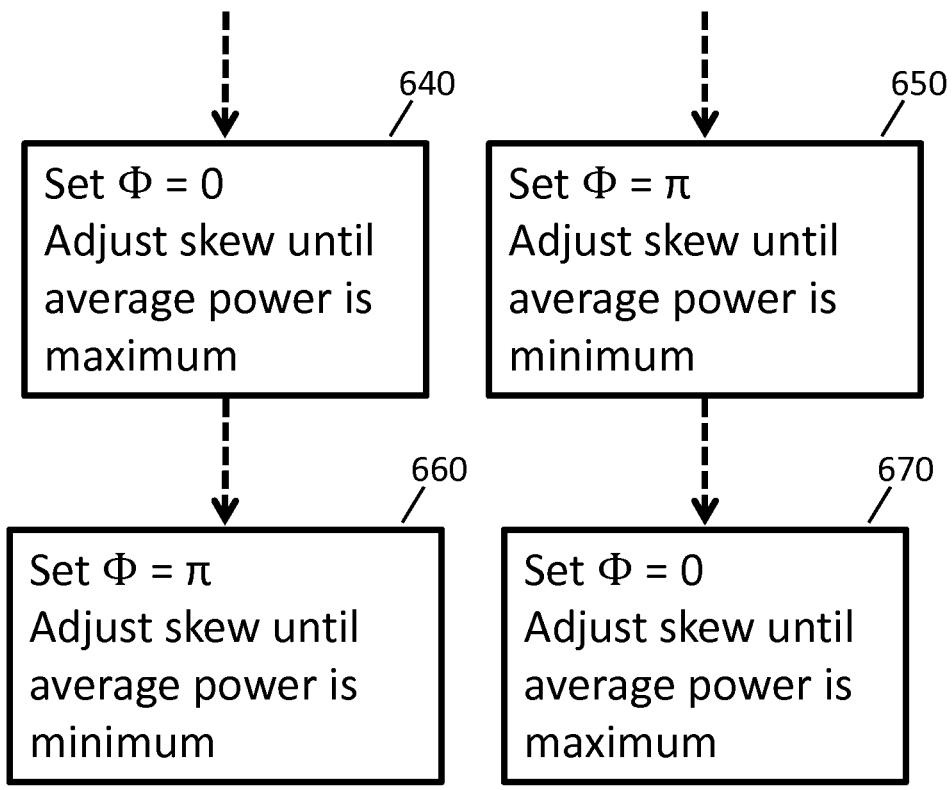

FIGS. 6A and 6B are a flow charts for an I/Q data alignment method using identical data streams. At 610, a QPSK modulator is provided having I and Q data inputs, phase control for adjusting relative I and Q carrier phase Φ, and a detector for measuring average modulator output power. At 620 identical copies of a pseudorandom series of data bits are sent to the I and Q data inputs where the delay, if any, between the I and Q copies of the bits is the skew. At 630, the average modulator output power is measured. At 640, the relative I and Q carrier phase is set to Φ=0 and the skew is adjusted until the average modulator output power is maximum. At 650, the relative I and Q carrier phase is set to Φ=π and the skew is adjusted until the average modulator output power is minimum. At 660, the relative I and Q carrier phase can be optionally set to Φ=π and the skew can be optionally adjusted until the average modulator output power is minimum. Alternatively at 670, the relative I and Q carrier phase can be optionally set to Φ=0 and the skew can be optionally adjusted until the average modulator output power is maximum. At 640, 650, 660 and 670, the skew can be adjusted in discrete, one-UI steps through the use of adjustable delays such as 162, 167 and 172 that impart delays on input lanes 162, 165 and 170, respectively in FIGS. 1A and 1B.

Figure 7A:
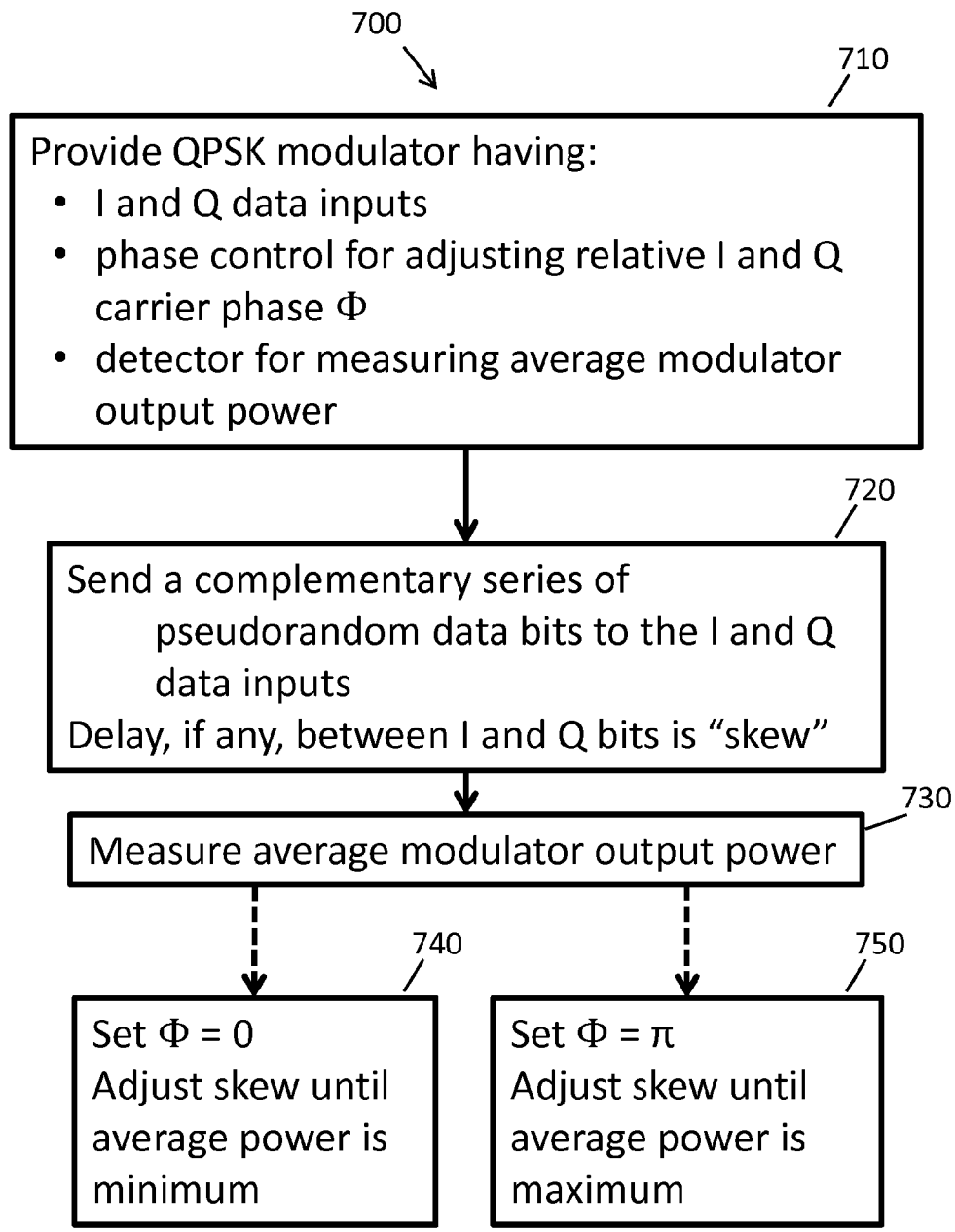
FIGS. 7A and 7B are a flow chart for an I/Q data alignment method using complementary data streams.
Figure 7B:
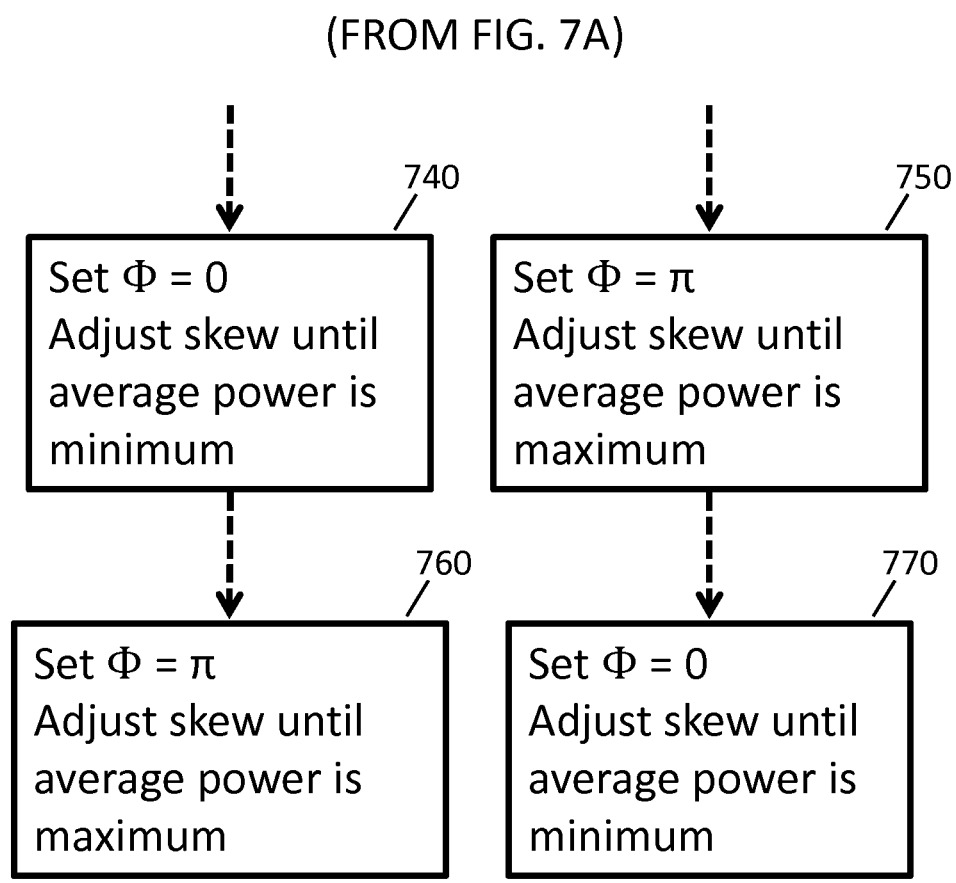

As explained above, zero skew coincides with minimum output power (Φ=0) or maximum output power (Φ=π) if complementary, rather than identical, I and Q data streams are used. FIGS. 7A and 7B are flow charts of an example of an I/Q data alignment method 700 using complementary data streams. At 710, a QPSK modulator is provided having I and Q data inputs, phase control for adjusting relative I and Q carrier phase Φ, and a detector for measuring average modulator output power. At 720, complementary copies of a pseudorandom series of data bits are sent to the I and Q data inputs where the delay, if any, between the complementary I and Q copies of the pseudorandom series of data bits is the skew. At 730, the average modulator output power is measured. At 740, the relative I and Q carrier phase is set to Φ=0 and the skew is adjusted until the average modulator output power is minimum. At 750, At 750, the relative I and Q carrier phase is set to Φ=π and the skew is adjusted until the average modulator output power is maximum. At 760, the relative I and Q carrier phase can be optionally set to Φ=π and the skew can be optionally adjusted until the average modulator output power is maximum. Alternatively at 770, the relative I and Q carrier phase can be optionally set to Φ=0 and the skew can be optionally adjusted until the average modulator output power is minimum. At 740, 750, 760 and 770, the skew can be adjusted in discrete, one-UI steps through the use of adjustable delays such as 162, 167 and 172 that impart delays on input lanes 162, 165 and 170, respectively in FIGS. 1A and 1B.

The methods described in this specification may be performed automatically after power cycles, clock resets or other disturbances, or they may be performed periodically. (For periodic operation, a disturbance that triggers deskewing methods may be the expiration of a predetermined time period.) An automated system for deskewing may be realized as part of a QPSK transmitter, e.g., as electronic circuitry communicatively coupled with the QPSK modulator. For example, control and interface circuits for sub-UI adjustable delays 115 and 135, UI-adjustable delays 162, 167 and 172, phase controller 150 and detector 155 may be included in transmitter ASICs. Thus a QPSK transmitter may automatically switch between a normal operating mode ($\Phi=\pi/2$) and a data skew monitoring or adjustment mode ($\Phi=0$ or $\pi$).

The techniques described in this document can be implemented using an apparatus, a method, a system, or any combination of an apparatus, methods, and systems. Implementations of the subject matter and the operations described in this document can be configured in digital electronic circuitry, or in computer software, firmware, or hardware, including the structures disclosed in this document and their structural equivalents, or in combinations of one or more of them. For a hardware implementation, the embodiments (or modules thereof) can be implemented within one or more application specific integrated circuits (ASICs), mixed signal circuits, digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described herein, or a combination thereof.

When the embodiments are implemented in software, firmware, middleware or microcode, program code or code segments, they can be stored in a machine-readable medium (or a computer-readable medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents.

While this document contains many specific implementation details, these should not be construed as limitations on the scope of any inventions or of what may be claimed, but rather as descriptions of features specific to particular implementations of particular inventions. Certain features that are described in this document in the context of separate implementations can also be configured in combination in a single implementation. Conversely, various features that are described in the context of a single implementation can also be configured in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The above description of the disclosed implementations is provided to enable any person skilled in the art to make or use the disclosure. Various modifications to these implementations will be readily apparent to those skilled in the art, and the principles defined herein may be applied to other implementations without departing from the scope of the disclosure. Thus, the disclosure is not intended to be limited to the implementations shown herein but is to be accorded the widest scope consistent with the principles and novel features disclosed herein.

What is claimed is:

1. A method for monitoring and aligning in-phase (I) and quadrature (Q) data in a quadrature phase shift keying (QPSK) modulator comprising:
    sending a series of data bits to an I data channel of the QPSK modulator and a copy of the series of data bits to a Q data channel of the QPSK modulator, the series of data bits and the copy of the series of data bits having a relative skew; and
    measuring average modulator output power as a function of the relative skew and carrier phase $\Phi$ between I and Q data channels at least in part by
        adjusting, with a phase control, the relative carrier phase $\Phi$,
        adjusting, with at least one adjustable data delay, the relative skew by integer numbers of unit-intervals for the adjusted relative carrier phase $\Phi$, and
        detecting, with a detector, the average modulator output power for combinations of the adjusted relative phase $\Phi$ and of the adjusted relative skew.

2. The method of claim 1, wherein said adjusting the relative skew comprises minimizing the measured average modulator output power to remove the relative skew when $\Phi=\pi$.

3. The method of claim 1, wherein said adjusting the relative skew comprises maximizing the measured average modulator output power to remove the relative skew when $\Phi=0$.

4. The method of claim 1, wherein the series of data bits comprises a pseudorandom stream of ones and zeroes.

5. The method of claim 1, wherein the QPSK modulator is an optical QPSK modulator.

6. The method of claim 1, wherein the QPSK modulator is a dual-polarization optical QPSK (DP-QPSK) modulator, and the steps of claim 1 are applied to each polarization of the DP-QPSK modulator independently.

7. A method for monitoring and aligning in-phase (I) and quadrature (Q) data in a quadrature phase shift keying (QPSK) modulator comprising:
    sending a series of data bits to an I data channel of the QPSK modulator and a complementary series of data bits to a Q data channel of the QPSK modulator, the series of data bits and the complementary series of data bits having a relative skew; and
    measuring average modulator output power as a function of the relative skew and carrier phase $\Phi$ between I and Q data channels at least in part by
        adjusting, with a phase control, the relative carrier phase $\Phi$,
        adjusting, with at least one adjustable data delay, the relative skew by integer numbers of unit-intervals for the adjusted relative carrier phase $\Phi$, and detecting, with a detector, the average modulator output power for combinations of the adjusted relative phase Φ and of the adjusted relative skew.

8. The method of claim 7, wherein said adjusting the relative skew comprises maximizing the measured average modulator output power to remove the relative skew when Φ=π.

9. The method of claim 7, wherein said adjusting the relative skew comprises minimizing the measured average modulator output power to remove the relative skew when Φ=0.

10. The method of claim 7, wherein the series of data bits comprises a pseudorandom stream of ones and zeroes.

11. The method of claim 7, wherein the QPSK modulator is an optical QPSK modulator.

12. The method of claim 7, wherein the QPSK modulator is a dual-polarization optical QPSK (DP-QPSK) modulator, and the steps of claim 1 are applied to each polarization of the DP-QPSK modulator independently.

13. Electronic circuitry for automatically aligning in-phase (I) and quadrature (Q) data in a quadrature phase shift keying (QPSK) modulator, the electronic circuitry comprising:
- a controller communicatively coupled with I and Q data channels of the QPSK modulator;
- an adjustable data delay;
- a phase control for adjusting relative carrier phase Φ between I and Q channels of the QPSK modulator; and
- a detector coupled to an output of the QPSK modulator to detect average modulator output power, wherein the controller is configured to
  - in response to meeting an alignment criterion, instruct the phase control to change the relative carrier phase from Φ=π/2 to Φ=0 or π, then
  - provide a series of data bits to the I data channel and another series of data bits to the Q data channel, the series of data bits and the other series of data bits having a relative skew,
  - measure average modulator output power as a function of skew, wherein to perform the measurements the controller is further configured to
    - instruct the adjustable data delay to adjust the relative skew by integer numbers of unit-intervals, and
    - read from the detector the average modulator output power for the adjusted relative skew,
  - determine an adjustment of the adjustable data delay corresponding to an extremum of the measured average modulator output power to remove the relative skew,
  - instruct the adjustable data delay to maintain the determined adjustment, and then
  - instruct the phase control to return the relative carrier phase to Φ=π/2.

14. The electronic circuitry of claim 13, wherein the alignment criterion is a power cycle or clock reset.

15. The electronic circuitry of claim 13, wherein the alignment criteria is the expiration of a predetermined time period.

16. The electronic circuitry of claim 13, wherein the series of data bits and the other series of data bits are pseudorandom streams of ones and zeroes.

17. The electronic circuitry of claim 16, wherein the other series of data bits is a copy of the series of data bits.

18. The electronic circuitry of claim 16, wherein the other series of data bits is complementary to the series of data bits.

19. The electronic circuitry of claim 13, wherein the QPSK modulator is an optical QPSK modulator.

* * * * *